United States Patent [19]

Self et al.

[11] Patent Number: 5,141,977

[45] Date of Patent: Aug. 25, 1992

[54] CHEMICAL COMPOSITION FOR IMPROVING THE WETTABILITY OF SYNTHETIC POLYMERIC MATERIALS FOR USE IN COMPOSITE APPLICATIONS

[75] Inventors: James M. Self, Taylors; Paul C. Fleischer, Spartanburg, both of S.C.

[73] Assignee: ABCO Industries, Ltd., Roebuck, S.C.

[21] Appl. No.: 346,087

[22] Filed: May 2, 1989

Related U.S. Application Data

[63] Continuation of Ser. No. 56,009, Jun. 1, 1987, abandoned, which is a continuation of Ser. No. 662,841, Oct. 19, 1984, abandoned.

[51] Int. Cl.⁵ .............................................. C08K 5/24
[52] U.S. Cl. .................................... 524/265; 524/114; 524/301; 524/316; 524/319; 524/506
[58] Field of Search ............... 524/319, 114, 301, 265, 524/316, 506; 526/206, 214, 237, 911

[56] References Cited

U.S. PATENT DOCUMENTS

| | | | |
|---|---|---|---|
| 3,839,254 | 10/1974 | Fang | 524/316 X |
| 3,923,715 | 12/1975 | Dettre | 524/316 X |
| 4,208,496 | 6/1980 | Bergfeld et al. | 524/393 |
| 4,278,578 | 7/1981 | Carpenter | 428/423.3 X |

Primary Examiner—Joseph L. Schofer
Assistant Examiner—J. M. Reddick
Attorney, Agent, or Firm—Dority & Manning

[57] ABSTRACT

Aqueous polymer composition for application to synthetic polymeric materials to improve wettability of same by polymer matrices and bond strength therebetween, which includes a polymer containing vinyl groups, in at least one and preferably two fluorocarbon surfactants and water. The composition also optionally, and preferably includes a copolymerizable surfactant and ethoxy silicone. Synthetic polymeric materials treated with the aqueous polymer composition are disclosed primarily as reinforcing materials in structural composites, either alone or in conjuction with other reinforcing materials. Composites utilizing the pretreated reinforcing materials are also included.

16 Claims, No Drawings

CHEMICAL COMPOSITION FOR IMPROVING THE WETTABILITY OF SYNTHETIC POLYMERIC MATERIALS FOR USE IN COMPOSITE APPLICATIONS

This is a continuation of application Ser. No. 07/056,009, filed Jun. 1, 1987 which is a continuation of Ser. No. 06/662,841, filed Oct. 19, 1984, both now abandoned.

BACKGROUND OF THE INVENTION

The present invention relates to novel compositions for application to synthetic polymeric materials to improve the wettability characteristics of the materials such that when the materials are utilized in the manufacture of laminates or composites, improved products result. The invention further relates to the synthetic polymeric materials coated with the chemical composition and to composites produced therefrom.

In recent years, structural composite materials have been produced suitable for use in replacing metallic structural elements in wide and various industries, stemming from both building structures to high tech applications such as aircraft, space vehicles, and the like. In general, such structural composite materials have included the reinforcement of a polymeric matrix with various forms of filamentary or fibrous materials such as glass fibers and filaments, carbonized fibers and filaments and the like. While such structural materials have been successfully employed, the two types referred to above are fraught with certain disadvantages. For example, the structural composites reinforced with carbonized fibers have historically been quite expensive, while the composites that include glass fibers or filaments experience certain strength or other problems. Particularly, insofar as glass reinforced composites are concerned, while the composites are adequate in tensile and compressive strength, the impact resistance of the structure is less than desired. In fact, in order to achieve a desired impact resistance, oftentimes the ultimate laminate size of the composite exceeds the dimensional requisites for the structure. Also, fragility of glass limits the processes in which the composites are made to those where the glass fabrics or materials are not broken.

It is also presently known that stiffness of a composite structure is achieved by mere contact between the polymer matrix and the reinforcing material. Ultimate strength of the composite is, however, dictated by the bond strength between the particular polymer matrix and the reinforcing material. In this vein, whereas it is likewise known that synthetic polymeric materials such as polyester, polypropylene, nylon, and the like possess impact strength characteristics exceeding those of the similar glass materials, successful utilization of such materials in a structural composite has heretofore proved generally unsuccessful. Such synthetic polymeric materials experience poor wettability by the polymer matrix being utilized, particularly unsaturated polyester resin syrups, whereby bond strength between the matrix and the reinforcing material is also poor. In the case of an epoxy matrix, certain coupler compounds such as silanes have been utilized, particularly in connection with glass reinforcing materials. With the saturated polyester syrup matrices, however, while same will suitably bond to glass, problems have been experienced in achieving proper bonds with synthetic polymeric materials such as the polyesters, polypropylenes, and the like.

Not only has the desirability of composite structures containing polyester or other types of synthetic reinforcing materials thus been realized, but in recent years, significant development effort has been expended towards pretreatment of synthetic polymeric materials to render same suitable for use in structural composites. Allied Fibers Division of Allied Corporation, for example, has pretreated polyester and nylon fibers with plastics overfinishes which are stated to improve the suitability of such fibers as reinforcing materials in structural composites. The Allied fibers are marketed under the trademark COMPET, which are stated to provide ample strength and a very high degree of toughness. Furthermore, plastic materials reinforced with COMPET fibers are stated to be resistant to impact, abrasion and fatigue.

While the composition applied to the COMPET fibers is unknown, it is believed that the subject matter of the present invention represents patentable improvement thereover. Particulary improved physical characteristics are achieved with composites produced from the synthetic materials treated according to teachings of the present invention compared to test results of composites utilizing the COMPET fibers. Further, as to the present invention, utilizing the novel composition taught hereby, pretreated synthetic polymeric materials may now be properly wetted out by polymer matrices for the formation of a strong bond therebetween. Composites produced therefrom exhibit improved physical properties over presently known composites.

There is no known prior art that is believed to anticipate or suggest the subject matter of the present invention.

SUMMARY OF THE INVENTION

It is an object of the present invention to provide a composition for application to synthetic polymeric materials, after which the pretreated materials may be appropriately wetted by a polymer matrix in the formation of reinforced composite materials.

Another object of the present invention is to provide a composition for application to synthetic polymeric materials in fiber, filament, fabric or non-woven sheet form which materials may thereafter be suitably used as reinforcing materials in the manufacture of composites.

Still further another object of the present invention is to provide a novel pretreated synthetic polymeric material suitable for use in the manufacture of reinforced composite materials and which will be appropriately wetted out by a polymer matrix utilized in conjunction therewith.

Yet another object of the present invention is to provide an improved textile material that includes synthetic polymeric portions which have been pretreated with a chemical composition to improve wettability of the textile material when exposed to polymer matrices.

Still another object of the present invention is to provide improved composite material which includes a polymer matrix reinforced with a synthetic polymeric material, which synthetic polymeric material will be appropriately wetted by a polymer matrix used in conjunction therewith.

Another object of the present invention is to provide an improved composite structure including a polymer matrix and a plurality of discrete reinforcing materials, at least one of which is a synthetic polymeric material that has been pretreated to improve wettability and therefore bond strength between the synthetic polymeric material and the polymer matrix.

Generally speaking, the polymeric coating composition for improving wettability of a synthetic polymer according to teachings of the present invention comprises an effective amount of a polymer containing vinyl groups; an effective amount of at least one fluorocarbon surfactant; and water.

More specifically, in a preferred embodiment, the composition according to the present invention includes a polymer that is an emulsion copolymer of butyl acrylate, methyl methacrylate, and methacrylic acid, and a blend of two fluorocarbon surfactants, one of which is water soluble and is preferably a fluorinated alkyl carboxylate, and the other is solvent soluble, and is preferably a fluorinated alkyl ester. Additionally, in a most preferred embodiment, the composition also includes a copolymerizable surfactant and an ethoxy silicone.

The wettability improving composition according to the present invention is preferably produced by conventional emulsion polymerization techniques in which the vinyl group containing monomers are blended in a polymerization vessel in addition to a catalyst, and preferably additionally the copolymerizable surfactant, ethoxy silicone, and fluorocarbon surfactant or surfactants. The reaction mixture is then polymerized at a temperature of between 178° F. and 195° F. Molecular weight control agents may also be employed, and surface tension of the composition preferably should be below about 35 dynes per centimeter.

Once the polymer composition is produced at a solids content in a range of from about 20-25% solids, the composition is thereafter diluted with water to a solids content of from about 1 to about 5% and same is padded onto the synthetic polymeric material to yield an add on of from about 0.5 to about 5.0 weight percent based on the weight of the material, after drying.

Synthetic polymeric materials having improved wettability characteristics according to teachings of the present invention have a polymer coating thereon in an amount of from about 0.5 to about 5 weight percent, based on the weight of the material, said polymer coating comprising a polymer containing vinyl groups, and at least one fluorocarbon surfactant. Preferably, the vinyl group containing polymer in the coating is an acrylic polymer, and most preferably a copolymer of butyl acrylate, methyl methacrylate, and methacrylic acid. Likewise, the fluorocarbon surfactant is preferably a blend of fluorocarbon surfactants, one of which is a water soluble surfactant, preferably a salt of a fluorinated alkyl carboxylate, while the other surfactant is solvent soluble, preferably a fluorinated alkyl ester.

Composite structures according to teachings of the present invention comprise a polymer matrix and a reinforcing material received within said matrix, said reinforcing material including a synthetic polymeric material having a polymeric coating thereon, said coating comprising a polymer containing vinyl groups and at least one fluorocarbon surfactant.

Synthetic polymeric materials according to the present invention include those polymeric materials, generally hydrophobic in nature which do not, per se, exhibit good wettability characteristics in the presence of polymer matrices as exemplified by unsaturated polyester resin syrups. Such polymeric materials include, without limitation, polyesters, polyamides, polyalkylenes and the like. Preferably, the material is present in textile form, as exemplified by filamentary form, fibrous form, woven fabric form, knitted fabric form, nonwoven sheet form or the like. Polymeric fibers may likewise be treated to improve bond strength to other polymeric matrices. Whichever form is utilized, the synthetic polymeric material is pretreated to provide a polymer coating thereon that will improve the wettability characteristics of same by a polymer matrix prior to cure of the matrix. Preferably, the precoat for the synthetic polymeric material includes an acrylic polymer, and most preferably a copolymer of butyl acrylate, methyl methacrylate and methacrylic acid; a copolymerizable surfactant; an ethoxy silicone; and at least one fluorocarbon surfactant, though preferably a blend of fluorocarbon surfactants.

Composites referred to herein include not only linear laminate composites, but likewise three-dimensional composite forms such as could be produced by various molding techniques in which the pretreated synthetic polymeric material may be the sole reinforcing medium within a polymer matrix, or may be used in conjunction with other reinforcing materials such as glass fibers, filaments or mats. Conventional polymer matrices are exemplified by epoxies and unsaturated polyester resin syrups, but without limitation. In other words, the three-dimensional composite should not be limited in form or shape other than as is dictated by the process for use of same in producing the particular product.

DESCRIPTION OF THE PREFERRED EMBODIMENTS

It has been desirable to improve the utilization of synthetic polymeric materials such as polyesters, polyamides, and polyalkylenes, generally in textile or film form for use in environs where bond strength between a polymer and the synthetic material is important, such as in the manufacture of structural composites. Particularly, synthetic polymeric textile materials are known to afford improved physical characteristics to a composite material when utilized therein as a reinforcing material. Such materials may also be processed by techniques not now available for glass reinforcing materials. Problems have also existed previously with composite materials which include a polymer matrix that surrounds and encapsulates a reinforcing material. Particularly the polymer matrix has been unable to properly wet the synthetic polymeric reinforcing materials during manufacture of the composite, whereby bond strength therebetween is low, leading to failure and/or delamination of the composite.

In accord with the present invention, it has been determined that a particular polymer precoat may be provided to the synthetic polymeric materials to facilitate the wetting of same by polymer matrices as utilized in production of composites. By way of example, reinforced composite materials produced heretofore have included a polymer matrix as exemplified by epoxies and unsaturated polyester resin syrups, both of which may be utilized in various molding techniques to produce a composite in conformity with the shape of the mold. In order to achieve the requisite strength characteristics required of the composite, reinforcing materials have been included which are imbedded within the polymer matrix. Such materials have historically been limited to glass and carbonized materials. Normally the reinforcing materials have taken textile form in that the materials are filamentary or fibrous in nature, and are utilized in woven fabrics, non-woven webs, composite fabrics or the like. As set forth hereinabove, the carbonized materials are extremely expensive thereby limiting the use of composites including same to specialized, or high tech end uses. At the same time, the glass materials that are utilized, while adequate in affording tensile strength properties to the composite, are somewhat deficient as to impact resistance and overall strength and durability of the composite.

The aqueous polymeric coating composition according to the present invention for application to synthetic polymeric materials, will enable the polymer matrix to appropriately wet-out the reinforcing material, whereby improved bond strength is achieved therebetween. Improved overall strength characteristics of the ultimate composite thus consequently follow. The polymer coating composition according to the present invention includes a polymer that contains vinyl groups, as exemplified by the various acrylics, vinyl acrylics, ethylene acetate, vinyl acetate, styrene, butadiene, ethyl acrylate, methyl acrylate, methyl methacrylate, acrylic acid, methacrylic acid, and the like, including mixtures of same. In fact, the polymer may be a homopolymer, copolymer, either block or graft or mixtures of same. A preferred polymer is a copolymer produced from sixty-three parts butyl acrylate, twenty parts methyl methacrylate, and seventeen parts methacrylic acid.

Conventional polymerization techniques may be utilized in producing the coating polymer. Monomeric ingredients are added in conjunction with an appropriate catalyst to a polymerization vessel after which the temperature of the vessel is appropriately maintained to accomplish polymerization. The polymerization process per se is not a part of the present invention and is believed to be adequately known to those skilled in the art that a particular detailed discussion of same is not required. It should be pointed out, however, that a number of additional constituents as set forth below may be employed in the coating composition, including a copolymerizable surfactant, ethoxy silicone, and one or more fluorocarbon surfactants. Each of these additional constituents may be added to the polymerization vessel or may be post-added subsequent to polymerization. Preferably, all constituents are added to the vessel prior to or during polymerization.

Insofar as the primary vinyl group containing polymer is concerned, molecular weight of same should be maintained in a range of from about 10,000 to about 500,000. Molecular weight control agents, exemplified by bromotrichloromethane, may be employed. Additionally, surface tension of the coating composition is preferably maintained below about 35 dynes per centimeter which may be achieved by use of surfactants. Additionally, the emulsion polymer composition produced is preferably neutralized to convert same to a hydrosol, i.e. the molecule swells by picking up water and changes in appearance from opaque to translucent. In hydrosol form, the polymer remains in suspension, but optically appears to be in solution.

Copolymerizable surfactants, if employed, should be included in an amount below a level where significant foaming occurs. It has been determined that up to about 0.3 percent by weight (solids) copolymerized surfactant is adequate, and that when present in a range as high as about 1 to 2 percent, foaming occurs. Exemplary of suitable copolymerizable surfactants, without limitation, are sodium styrene sulfonate and a sodium salt of a short chain vinyl sulfonate.

Whereas the ethoxy silicone may not be critical to success of the present composition, same is present in the most preferred overall composition in an amount of from about 0.2 to about 2.0 weight percent based on solids.

The fluorocarbon surfactant constituent is critical, and preferably is a blend of a water soluble fluorocarbon surfactant and a solvent soluble fluorocarbon surfactant. A preferred water soluble surfactant is a potassium fluorinated alkyl carboxylate that is anionic in nature, as exemplified by FLUORAD FC-129 manufactured by 3M, St. Paul, Minn. Exemplary of a preferred solvent soluble surfactant is FLUORAD FC-430 a non-ionic, fluorinated alkyl ester, manufactured by 3M.

The polymer coating composition when produced preferably contains from about 20 to about 25 percent solids, though for application the composition is diluted to from about 1 to about 5 percent solids by weight after which same may be padded onto the synthetic polymeric material to achieve a solids add-on from about 0.5 to about 5.0 weight percent based on the weight of the material. The material is thereafter dryed, and is then ready for use as a reinforcing medium within a structural composite.

The particular form of the synthetic polymeric material precoated according to the present invention is not critical. In this regard, synthetic polymeric films, textile materials and the like may be employed and the term synthetic polymeric material should be considered as referring to same. Textile materials are, however, preferred as reinforcing materials, and may take the form, as mentioned above, of filaments, fibers, woven fabrics, knitted fabrics, non-woven webs, composite fabrics and the like. Moreover, whereas it is contemplated that the synthetic polymeric textile reinforcing materials according to the present invention would be utilized in conjunction with glass strands, fibers, fabrics, or the like, one form that is quite suitable for use according to the present invention is a composite fabric that incorporates the synthetic polymeric textile materials and the glass or other reinforcing material. Such a composite fabric structure may be produced by any of a number of processes, one of which is to develop a series of knit stitches about the components to lock one component to the other. A stitch-through or knit-stitch type machine such as a Malimo machine manufactured by VEB Textimaforschuno Malimo may be employed. On a Malimo type machine, the glass and/or the synthetic polymeric materials may be utilized in strand form whether filamentary or spun. One of the components is fed as warp ends along the machine direction and the other of the components is fed in the cross-machine direction as filling or weft strands. The filling or weft strands are normally laid atop the warp strands and pass through a throat where knit-stitches are produced about the two, thereby incorporating same into a composite fabric. In like fashion, an additional woven, knitted, or non-woven layer may likewise be fed into the machine and incorporated into the composite fabric.

The present invention can be better understood by reference to the following examples.

EXAMPLE I

The following listed ingredients were added to the polymerization kettle: 700 grams water; 1½ gms. ammonium persulfate catalyst; 3 gms ethoxy silicone. Thereafter, 117 gms. of butyl acrylate monomer, 105 gms. of methyl methacrylate monomer, and 28 gms. of methacrylic acid were gradually added to the kettle over a period of 1½ hours at a temperature of 188° F. Polymerization was then completed with the addition of a conventional chaser catalyst, after which the polymer was removed from the kettle and exhibited the following characteristics:

| | |
|---|---|
| viscosity | 250 cps |
| solids | 25% |
| specific gravity | 1.036 |
| surface tension | 37 dynes/cms. |

Thereafter, 0.75 gm. of FLUROAD FC 129, a fluorinated alkyl carboxylate and 0.75 gm. of FLUORAD FC 430, a fluorinated alkyl ester were mixed well into the polymer composition. Surface tension dropped to 29 dynes per centimeter.

EXAMPLE 2

The polymer composition of Example 1 was diluted with water to yield a solids content of 1% by weight, after which a needle punched non-woven web was dipped into the aqueous polymer composition. Thereafter the fabric was wrung out and dried for about 5 minutes at a temperature of 250 degrees F. The needle-punched, non-woven web of this example was 100 percent polyester with fifty percent ½ inch, six denier polyester staple, and fifty percent ¼-inch, six denier polyester staple. Fabric basis weight was 2.7 ounces per square yard.

EXAMPLE 3

Example 2 was repeated with the exception that the non-woven web utilized had a basis weight of 5.5 ounces per square yard.

EXAMPLES 4-11

In order to determine the ability of a polymer coating to be appropriately wet out by a polymer matrix in the manufacture of a composite, the following screening test was devised. The particular coating composition being evaluated was applied to a needle-punched non-woven web according to the procedures of Example 2. About 25 gms. of a catalyzed, general purpose, unsaturated polyester resin syrup (Stypol, manufactured by Freeman Chemical, Port Washington, Wis.) was placed in the top half of a one pint paint can lid. The treated non-woven web was then placed on top of the resin and allowed to settle. A tongue depressor was used to force the fabric into the resin, if needed. When the fabric was appropriately covered with resin, a like quantity of the Stypol resin syrup was poured onto the top of the resin fabric, and a piece of polymer film placed across the lid. Ambient cure occurred in about twenty minutes. An opaque appearance of the laminate indicates improper wetting while a translucent appearance indicates proper wetting of the web by the polyester resin syrup. Results are indicated Table I below.

In the coating column of Table I, A is a copolymer of butyl acrylate/acrylonitrile/methyl methacrylate/methacrylic acid/acrylic acid prepared generally according to procedures set forth in Example 1. In like fashion, B is the copolymer of butyl acrylate/methyl methacrylate/methacrylic acid prepared as Example 1 but without the addition of the fluorocarbon surfactants. C represents a blend of equal parts of FORAD FC-129 and FC-430, post-added to the aqueous polymer composition.

TABLE I

| Example No. | Coating | Result |
|---|---|---|
| 4 | A | Opaque |
| 5 | A + .2 gm C | Translucent |
| 6 | A + .4 gm C | Translucent |
| 7 | A + .6 gm C | Translucent |
| 8 | B | Opaque |
| 9 | B + .2 gm C | Translucent |
| 10 | B + .4 g C | Translucent |
| 11 | B + .6 g C | Translucent |

EXAMPLES 12-17

Following the procedure set forth in Example 4, a 100% polyester woven fabric; a 100% polypropylene, needle punched non-woven web, 4 oz. per square yard; and a nylon woven fabric, about 2-3 oz. per square yard; were each tested with and without the coating composition of Example 1 so as to determine wettability of same in production of a composite laminate. Results are indicated in Table II.

TABLE II

| Example No. | Reinforcing Material | Coating | Results |
|---|---|---|---|
| 12 | PE woven fabric | none | Opaque |
| 13 | PE woven fabric | Ex. 1 | Translucent |
| 14 | PP non-woven | none | Opaque |
| 15 | PP non-woven | Ex. 1 | Translucent |
| 16 | Nylon fabric | none | Opaque |
| 17 | Nylon fabric | Ex. 1 | Translucent |

Table II thus indicates that the various synthetic polymeric textile materials when used without the coating of the present invention do not properly wet-out in a composite laminate. When, however, the coating of Example 1 is applied thereto, proper wetting with the polymer matrix is achieved, and therefore good bond strength results.

EXAMPLES 18-24

In order to evaluate the relative physical characteristics of composites according to the present invention compared generally to known composites, the composites as set forth in Table III were tested. In each case, the particular synthetic polymeric textile material referred to by example number had been precoated with the polymer composition of Example 1. Likewise, more than one reinforcing material indicates the hand lay-up of independent reinforcing materials, one atop the other. General procedures for producing the composite as outlined in Example 4 were followed with the reinforcing material, of course, being varied, and with a quantity of matrix between adjacent layers of reinforcing material.

As can be seen from Table III, the utilization of the precoated synthetic polymeric textile materials produce laminates that at least approximated typical values for a reinforced composite for hand lay-up laminates, and in many cases exceeded same. Note particularly Izod impact, (which is normally from about 1 to about 2) tensile modulus and flexural modulus. Table III thus indicates that utilization of precoated synthetic polymeric textile materials in conjunction with conventional glass materials affords a structural composite having improved characteristics.

TABLE III

| EX NO | REINFORCING MATERIAL | TENSILE STRENGTH lbs/in² | FLEXURAL STRENGTH lbs/in² | IZOD IMPACT | TENSILE MODULUS lbs/in² × 10⁶ | FLEXURAL MODULUS lbs/in² × 10⁶ |
|---|---|---|---|---|---|---|
|  | Typical Values* | 4,000–9,000 | 8,500–26,000 | .5–16 | 2.0–2.8 | 1–3 |
| 18 | Woven glass ribbon; 2.7 oz/yd² needle punch | 22,330 | 9,290 | 12.4 | 1.16 | 6.63 |
| 19 | 2.7 oz/yd² needle punch; 1¼ oz/ft² chopped strand mat | 6,300 | 7,990 | 4.4 | 7.74 | 6.63 |
| 20 | 5.5 oz/yd² needle punch; Woven Roving glass ribbon | 9,010 | 9,110 | 7.1 | 9.84 | 7.88 |
| 21 | 5.5 oz/yd² needle punch; 1¼ oz/ft² chopped strand mat | 3,820 | 9,010 | 4.0 | 9.71 | 4.68 |
| 22 | 5.5 oz/yd² needle punch; 5 woven glass ribbon, 1¼ oz/ft² chopped strand mat | 10,940 | 10,940 | 19.0 | 9.71 | 4.68 |
| 23 | 4 layers, 5.5 oz/yd² needle punch | 3,990 | 7,720 | 2.3 | 5.17 | 4.21 |

*TAKEN FROM MODERN PLASTICS ENCYCLOPEDIA, 1982-83 FOR HAND LAY-UP LAMINATES

EXAMPLE 24

Utilizing the precoated non-woven web of Example 3, a 19 foot boat hull was constructed as follows. A conventional cured gel coat layer was produced in the mold. Alpha general purpose unsaturated polyester resin syrup was sprayed onto the gel coat layer. Cut portions of the precoated non-woven of Example 3 were laid up by hand onto the wet Alpha resin and rolled by hand to conform to the mold contour. Further Alpha resin was sprayed onto the surface of the laid up non-woven of Example 3, cut sections of COFAB, a 16 ounce per square yard woven roving of monoaxial glass filaments were laid up by hand onto the wet resin and rolled out into mold conformity. The composite was cured at ambient temperature and pressure. The resulting composite in boat form proved totally satisfactory insofar as strength characteristics are concerned, with improved stiffness.

EXAMPLE 25

Example 1 was repeated with the exception that the stated quantities of the two fluorocarbon surfactants were added to the polymerization vessel prior to addition of the monomer mix. Thereafter, the polymer composition produced was applied to the non-wovens of Examples 2 and 3 and composites were produced therefrom according to the procedure of Example 4. Results were at least as good as those where the fluorocarbon surfactants were post-added to the polymer compositions.

EXAMPLE 26

An emulsion polymer composition was produced according to the procedures of Example 1 with the exception that the FORAD FC 129 surfactant was omitted from the overall composition. Thereafter, non-woven material of Example 3 was treated with this composition and a composite produced therefrom according to Example 4. While some improvement was apparent over the untreated web according to the screening test, it was likewise apparent that the improvement was not as great as where both fluorocarbon surfactants were present.

EXAMPLE 27

Example 26 was repeated with the exception that the FORAD FC 430 surfactant was used in lieu of the FC 129 surfactant. Like results were achieved.

EXAMPLE 28

In order to ascertain the efficiency of pretreatment of the reinforcing materials, the particular fluorocarbon surfactants set forth above were added directly to the unsaturated polyester resin syrup that was employed as the polymer matrix. When tested, wettability of the reinforcing material was not improved. Such indicates a need for the pretreatment of the reinforcing material.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. An aqueous composition for applying to synthetic polymeric materials to improve the wettability of said synthetic polymeric materials by a polymer matrix so that improved bond strength between said synthetic polymeric material and said polymer matrix is achieved, said aqueous composition comprising:
   a) a polymer produced form acrylic monomers; and
   b) a blend of fluorocarbon surfactants wherein one of said fluorocarbon surfactants is water soluble and one of said fluorocarbon surfactants is non-water soluble.

2. A composition is defined in claim 1 wherein the polymer is neutralized to hydrosol form.

3. A composition as defined in claim 1 wherein the polymer is an acrylic polymer.

4. A composition as defined in claim 3 wherein the acrylic polymer is a copolymer.

5. A composition as defined in claim 4 wherein the copolymer contains butyl acrylate, methyl methacrylate and methacrylic acid.

6. A composition as defined in claim 1 wherein the water soluble surfactant is a fluorinated alkyl carboxylate.

7. A composition as defined in claim 1 wherein the non-water soluble surfactant is a fluorinated alkyl ester.

8. A composition as defined in claim 1 further comprising a copolymerizable surfactant and an ethoxy silicone.

9. A composition as defined in claim 8 wherein the copolymerizable surfactant is an unsaturated organic surfactant.

10. A composition as defined in claim 1 wherein the polymer is present in an amount of from about 0.5 to about 5 weight percent and the fluorocarbon surfactants are present in an amount of at least about 0.05 weight percent based on solids.

11. An aqueous composition for applying to synthetic polymeric materials to improve the wettability of said synthetic polymeric materials by a polymer matrix so that improved bond strength between said synthetic polymeric material and said polymer matrix is achieved, said aqueous composition consisting essentially of:
   a) a polymer produced from acrylic monomers; and
   b) a blend of fluorocarbon surfactants wherein one of said fluorocarbon surfactants is water soluble and one of said fluorocarbon surfactants is non-water soluble.

12. A composition as defined in claim 11 wherein said polymer is a copolymer produced from butylacrylate, methylmethacrylate and methacrylic acid.

13. A composition as in claim 11 wherein said water soluble surfactant is a fluorinated alkyl carboxylate.

14. A composition as defined in claim 11 wherein said non-water soluble fluorocarbon surfactant is a fluorinated alkyl ester.

15. A composition as defined in claim 11 further including a copolymerizable surfactant and an ethoxysilicone.

16. An aqueous composition for application to synthetic polymeric materials to improve wettability of same by a polymer matrix comprising a copolymer of butylacrylate, methylmethacrylate and methacrylic acid, a water soluble fluorocarbon surfactant and a non-water soluble fluorocarbon surfactant.

* * * * *